(12) United States Patent
Boenig

(10) Patent No.: US 9,386,745 B2
(45) Date of Patent: Jul. 12, 2016

(54) CORN HEADER FOR A FORAGE HARVESTER INCLUDING A SIDE SEPARATING MECHANISM

(71) Applicant: CLAAS SAULGAU GMBH, Bad Saulgau (DE)

(72) Inventor: Ingo Boenig, Guetersloh (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 0 days.

(21) Appl. No.: 14/198,731

(22) Filed: Mar. 6, 2014

(65) Prior Publication Data

US 2014/0250850 A1    Sep. 11, 2014

(30) Foreign Application Priority Data

Mar. 8, 2013    (DE) .......................... 10 2013 003 970

(51) Int. Cl.
  *A01D 65/00*    (2006.01)
  *A01D 45/02*    (2006.01)
  *A01D 34/23*    (2006.01)

(52) U.S. Cl.
  CPC .............. *A01D 45/021* (2013.01); *A01D 34/23* (2013.01)

(58) Field of Classification Search
  CPC ..... A01D 34/23; A01D 33/06; A01D 45/021; A01D 63/02
  USPC ............................. 56/316, 158, 219; 172/33
  See application file for complete search history.

(56) References Cited

U.S. PATENT DOCUMENTS

| 1,108,536 | A | * | 8/1914 | Wodtli | 56/316 |
|---|---|---|---|---|---|
| 1,597,578 | A | * | 8/1926 | Burke | 56/316 |
| 1,677,668 | A | * | 7/1928 | Barber | 56/316 |
| 2,097,921 | A | * | 11/1937 | Hite | 56/316 |
| 2,195,518 | A | * | 4/1940 | Johnson | 56/316 |
| 2,284,517 | A | * | 5/1942 | Fink | 74/502.5 |
| 2,521,999 | A | * | 9/1950 | Thurman | 56/1 |
| 2,530,733 | A | * | 11/1950 | Ronning | A01D 34/125 56/17.6 |
| 2,852,955 | A | * | 9/1958 | Chavis et al. | 74/422 |
| 4,694,640 | A | * | 9/1987 | Ermacora et al. | 56/16.4 R |
| 5,237,804 | A | * | 8/1993 | Bertling | A01D 43/082 56/102 |
| 5,711,140 | A | * | 1/1998 | Burmann | 56/208 |
| 5,768,865 | A | * | 6/1998 | Rosenbalm | A01D 43/10 56/13.6 |
| 5,867,972 | A | | 2/1999 | Laumann et al. | |
| 6,298,643 | B1 | * | 10/2001 | Wuebbels | A01D 43/082 56/119 |
| 6,430,907 | B2 | * | 8/2002 | Wolters | A01D 45/021 56/60 |
| 6,837,034 | B1 | * | 1/2005 | Krone | A01D 65/00 56/14.3 |
| 7,082,742 | B2 | * | 8/2006 | Schrattenecker | 56/208 |
| 7,726,108 | B1 | * | 6/2010 | Pruitt | A01D 61/004 56/14.5 |
| 2013/0263566 | A1 | * | 10/2013 | Lovett et al. | 56/158 |
| 2014/0250850 | A1 | * | 9/2014 | Boenig | A01D 45/021 56/94 |

FOREIGN PATENT DOCUMENTS

AT    410744    7/2003

(Continued)

*Primary Examiner* — Árpád Fábián-Kovács
(74) *Attorney, Agent, or Firm* — Michael J. Striker

(57) ABSTRACT

A corn header (4) for a forage harvester for harvesting stalked crop includes a set of cutting and intake conveyor mechanisms for cutting the crop in a substantially horizontal direction. A separating mechanism for separating the crop in a substantially vertical direction is positioned on at least one side of the corn header, laterally next to the cutting and intake conveyor mechanisms.

5 Claims, 1 Drawing Sheet

(56) References Cited

FOREIGN PATENT DOCUMENTS

| | | |
|---|---|---|
| DE | 215449 | 11/1984 |
| DE | 19632895 | 2/1998 |
| DE | 10 2004 022 534 | 12/2005 |
| DE | 102011008723 | 7/2012 |
| FR | 2805123 A1 * | 8/2001 ............ A01D 34/23 |
| JP | 2013123390 A * | 6/2013 ............ A01D 34/23 |
| WO | WO 2012/098061 | 7/2012 |
| WO | WO 2013089224 A1 * | 6/2013 ............ A01D 34/30 |

* cited by examiner

CORN HEADER FOR A FORAGE HARVESTER INCLUDING A SIDE SEPARATING MECHANISM

CROSS-REFERENCE TO A RELATED APPLICATION

The invention described and claimed hereinbelow is also described in German Priority Document DE 10 2013 003970.3, filed on Mar. 8, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a corn header for a forage harvester and a forage harvester comprising such a corn header.

In the case of harvesting machines, a basic distinction is made between harvesting machines in which the crop is threshed, and harvesting machines in which the crop is chopped. Harvesting machines designed as combine harvesters are typically used when the crop to be harvested is a type of grain such as wheat, barley, or oats, or when the crop is rapeseed. Harvesting machines designed as forage harvesters are typically used, however, when the type of crop to be harvested is corn or sorghum.

A harvesting machine designed as a combine harvester, in the case of which a crop to be harvested is threshed, comprises a cutting and intake conveyor mechanism having a plurality of cutting parts, which harvest the crop by implementing a scissors-like severance cut. A harvesting machine designed as a forage harvester, however, comprises a cutting and intake conveyor mechanism designed as a corn header, which comprises a plurality of rotatably driven cutting and intake conveyor mechanisms.

DE 10 2004 022 534 A1 makes known a harvesting machine designed as a forage harvester for harvesting stalked crop such as corn or the like. The harvesting machine comprises a corn header, which has a plurality of cutting and feed units, wherein each cutting and feed unit has a plurality of rotatably driven, drum-like cutting and intake conveyor mechanisms that are substantially rotatable about a vertical axis of rotation, for separating the crop in a substantially horizontal direction.

The corn header known from DE 10 2004 022 534 A1 is suitable for use, without restrictions, to harvest corn. This corn header also is basically suitable for use to harvest other crops, such as sorghum, for example, which has thinner stalks than corn. When thin-stalked crop is harvested with the aid of such a corn header, problems can occur when the crop to be harvested is not standing vertically as individual plants in the stand to be harvested but is instead intertwined, lying horizontally or both. In this case, gathering the crop can cause the corn header to become clogged on the side moving through the stand during the harvesting operation.

SUMMARY OF THE INVENTION

The present invention overcomes the shortcomings of known arts, such as those mentioned above.

To that end, the present invention provides a corn header for a forage harvester and a forage harvester having such a corn header in which the crop to be harvested is chopped although not subsequently threshed.

In an embodiment, a corn header for a forage harvester for harvesting stalked crop comprises a plurality of cutting and intake conveyor mechanisms for cutting the crop from the ground in a substantially horizontal direction, wherein a separating mechanism for separating the crop in a substantially vertical direction is positioned on at least one side of the corn header, laterally next to the cutting and intake conveyor mechanisms. The corner header makes it possible to harvest thin-stalked crop, such as sorghum, without restrictions, with the aid of a corn header.

The inventive corn header, and forest harvester configured with the corn header, can be used to particular advantage to harvest plants that have grown together or that are intertwined.

Preferably, the separating mechanism or each separating mechanism extends upwardly relative to a separating plane of the cutting and intake conveyor mechanisms. This arrangement makes it possible to cut intertwined crop or horizontally lying crop particularly effectively at the edge of the stand and to process said crop in the corn header.

A lateral separating mechanism is preferably disposed as far forward on the corn header as possible so that the plant parts extending laterally into the working region of the corn header are cut at the edge of the stand before the plant parts enter the effective region of conveyor elements of the cutting and intake conveyor mechanisms. Advantageously, these plant parts are then conveyed to an intake region of the forage harvester without drawing in additional plants or plant parts from the stand that has not yet been cut from the ground into the working region of the corn header.

The rotatably driven cutting and intake conveyor mechanisms are designed in the form of drums or chains and are rotatably driven. Advantageously, the separating mechanism or each separating mechanism comprises separating knives, which are displaceable in a substantially linear manner relative to one another while implementing a scissors-like severance cut on the crop. This allows for parts for separating the crop, which operate according to different mechanisms of actions, to be used on a corn header.

The cutting and intake conveyor mechanisms, which are used to cut the crop from the ground in the substantially horizontal direction, are rotatably driven and are preferably designed in the form of drums or chains. These cutting and intake conveyor mechanisms convey the plants or plant parts cut from the ground, by means of conveying elements, in the direction of the intake conveyor mechanism of the forage harvester. The separating mechanisms used to separate the crop substantially in the vertical direction comprise separating knives that are displaceable in a substantially linear manner relative to one another while implementing a scissors-like severance cut.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
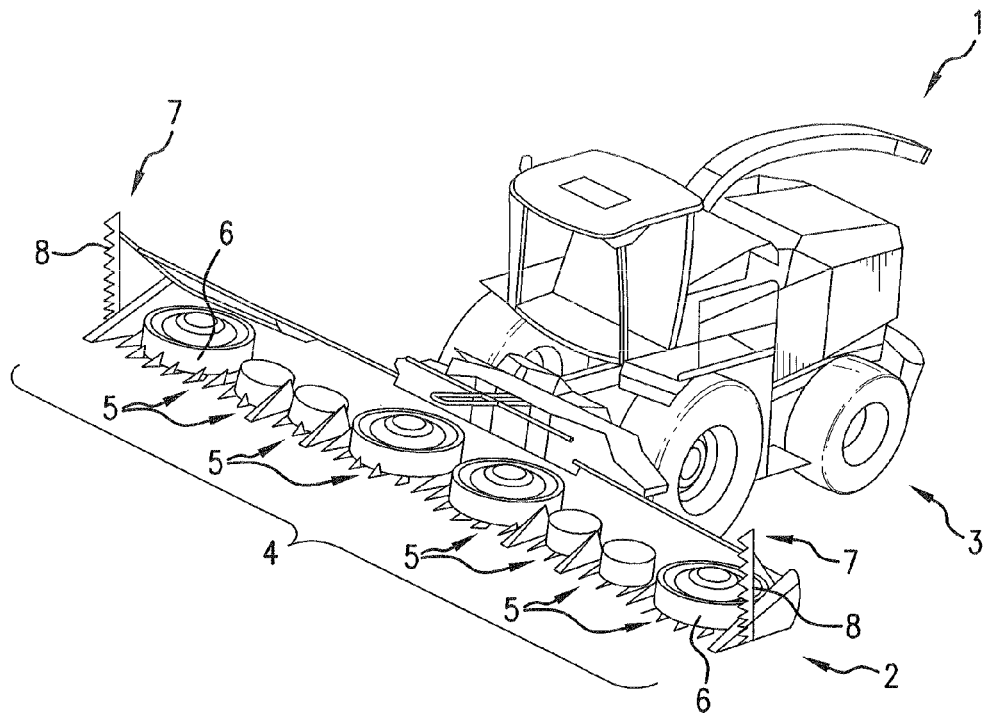
FIG. 1 presents a perspective view of a forage harvester comprising a corn header according to the invention.
Figure 2:
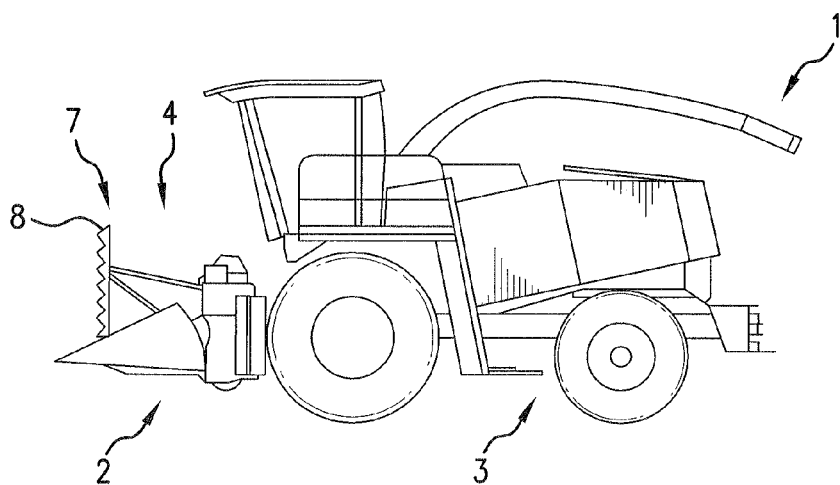
FIG. 2 presents a side view of the forage harvester from FIG. 1.

FIGS. 1 and 2 together show a forage harvester with a corn header constructed according to the invention.

In greater detail, forage harvester 1 comprises a front attachment 2, which is coupled to a carrier vehicle 3 and is moved forward by the carrier vehicle 3 to perform harvesting work.

The front attachment 2 is a corn header 4 for harvesting stalked crop, such as corn or sorghum, for example.

As shown, the corn header 4 comprises a plurality of cutting and feed units 5, wherein each cutting and feed unit 5 has a plurality of rotatably driven and drum-like cutting and intake conveyor mechanisms 6, which can rotate about a vertical axis.

Many features of the forage harvester are known from DE 10 2004 022 534 A1, for example.

It should be noted that that the rotatably driven cutting and intake conveyor mechanisms 6 of the cutting and feed units of the corn header 4 also can be designed as chain-type cutting and intake conveyor mechanisms 6. The rotatably driven cutting and intake conveyor mechanisms 6 of the corn header 4 are used to separate or cut the crop from the ground in a substantially horizontal direction. Furthermore, the cutting and intake conveyor mechanisms 6 are equipped with conveying elements in order to convey the crop to the intake conveyor mechanism of the forage harvester. The intake conveyor mechanism feeds the crop to the chopping device, where said crop is chopped, i.e. is cut into small pieces. The thusly created chopped crop is ejected via an upper discharge chute onto a trailer and is hauled away.

In the corn header 4, a separating mechanism 7 for separating the crop in a substantially vertical direction is positioned on at least one side of the corn header 4, laterally next to the rotatably driven cutting and intake conveyor mechanisms 6. As shown, such a separating mechanism 7 is disposed on both sides of the corn header 4, laterally next to the cutting and intake conveyor mechanisms 6.

The separating mechanisms 7 extend upwardly, preferably substantially vertically, relative to a separating plane of the cutting and intake conveyor mechanisms 6, which extend in the horizontal direction.

As already explained, the cutting and intake conveyor mechanisms 6 of the corn header 4 are drum-like or chain-like, rotatably driven cutting and intake conveyor mechanisms 6 and are rotatably displaced relative to one another, for separating the crop in a substantially horizontal separating direction or plane. The separating mechanisms 7, which are disposed on both sides of the cutting and intake conveyor mechanisms 6, have a plurality of separating knives 8. The separating knives 8 are displaceable in a substantially linear manner relative to one another while implementing a scissors-like severance cut and are used to separate the crop in a substantially vertical separation direction.

Advantageously, different cutting techniques are used on a corn header 4 to separate the crop. Namely, in the region of the cutting and intake conveyor mechanisms 6, a cutting technique utilizing a rotating motion of the cutting and intake conveyor mechanisms 6 to separate the crop in the horizontal direction and, at the separating mechanisms 7, a cutting technique utilizing a translatory motion for the scissors-like separation of the crop in the vertical direction.

Additionally, the separating mechanism 7 is (or multiple separating mechanisms are) connected to an interface of the corn header 4, to which a so-called silage corn auger can be connected as a replacement for the particular separating mechanism 7. In a first variant of the invention, the separating mechanism(s) 7 can be driven independently of the cutting and intake conveyor mechanisms 6. Alternatively the separating mechanism(s) 7 can be driven jointly with the cutting and intake conveyor mechanisms 6.

Preferably, the cutting and intake conveyor mechanisms 6 are mechanically driven and the separating mechanisms 7 are hydraulically driven. It also is possible, however, to utilize other drive variants for the cutting and intake conveyor mechanisms 6 and for the separating mechanisms 7. For example, the cutting and intake conveyor mechanisms 6 and the separating mechanisms 7 can be driven mechanically and/or hydraulically and/or electrically in any combination.

LIST OF REFERENCE CHARACTERS 1 forage harvester
2 front attachment
3 carrier vehicle
4 corn header
5 cutting and feed unit
6 cutting and intake conveyor mechanism
7 separating mechanism
8 separating knife As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A corn header for a forage harvester for harvesting stalked crop, comprising:
   a plurality of rotatably driven cutting and intake conveyor mechanisms (6) for cutting the crop from the ground in a substantially horizontal direction; and
   a separating mechanism (7) for separating the crop in a substantially vertical direction;
   wherein the separating mechanism (7) comprises separating knives (8) that are vertically displaceable and implement a scissors-like severance cut and is positioned respectively on one side of the corn header (4), laterally next to the cutting and intake conveyor mechanisms (6); and
   wherein the cutting and intake conveyor mechanisms (6) comprise drums and are equipped with conveying elements for conveying the crop such that the crop is cut and conveyed by the cutting and intake conveyor mechanisms (6) via a rotating motion.

2. The corn header according to claim 1, wherein separating mechanism (7) extends upwardly relative to a separating plane of the cutting and intake conveyor mechanisms (6).

3. The corn header according to claim 2, wherein separating mechanism (7) extends substantially vertically upwardly relative to the separating plane of the cutting and intake conveyor mechanisms (6).

4. A forage harvester, comprising a front attachment (2) designed as a corn header (4) for harvesting stalked crop, wherein the corn header (4) is coupled to a carrier vehicle (3) and wherein the corn header comprises:
- a plurality of rotatably driven cutting and intake conveyor mechanisms (6) for cutting the crop from the ground in a substantially horizontal direction; and
- a separating mechanism (7) for separating the crop in a substantially vertical direction that is positioned at one side of the corn header (4), laterally next to the cutting and intake conveyor mechanisms (6);
- wherein the separating mechanism (7) comprises separating knives (8) that are vertically displaceable and implement a scissors-like severance cut; and
- wherein the cutting and intake conveyor mechanisms (6) comprise drums and are equipped with conveying elements for conveying the crop such that the crop is cut and conveyed by the cutting and intake conveyor mechanisms (6) via a rotating driving motion.

5. A corn header for a forage harvester for harvesting stalked crop, comprising:
- a plurality of rotatably driven cutting and intake conveyor mechanisms (6) that are arranged laterally for cutting the crop from the ground in a substantially horizontal direction; and
- a separating mechanism positioned on one side of the corn header (4), laterally next to the cutting and intake conveyor mechanisms (6);
- wherein the separating mechanism comprises separating knives (8) that are vertically displaceable and implement a scissors-like severance cut for separating the crop in a substantially vertical direction; and
- wherein the cutting and intake conveyor mechanisms (6) comprise drums and are equipped with conveying elements for cutting and conveying the crop via a rotating motion.

* * * * *